Dec. 2, 1924.  
F. O. ALBERTSON  
POWER TRANSMITTING ARRANGEMENT  
Filed Jan. 16, 1922
1,517,240
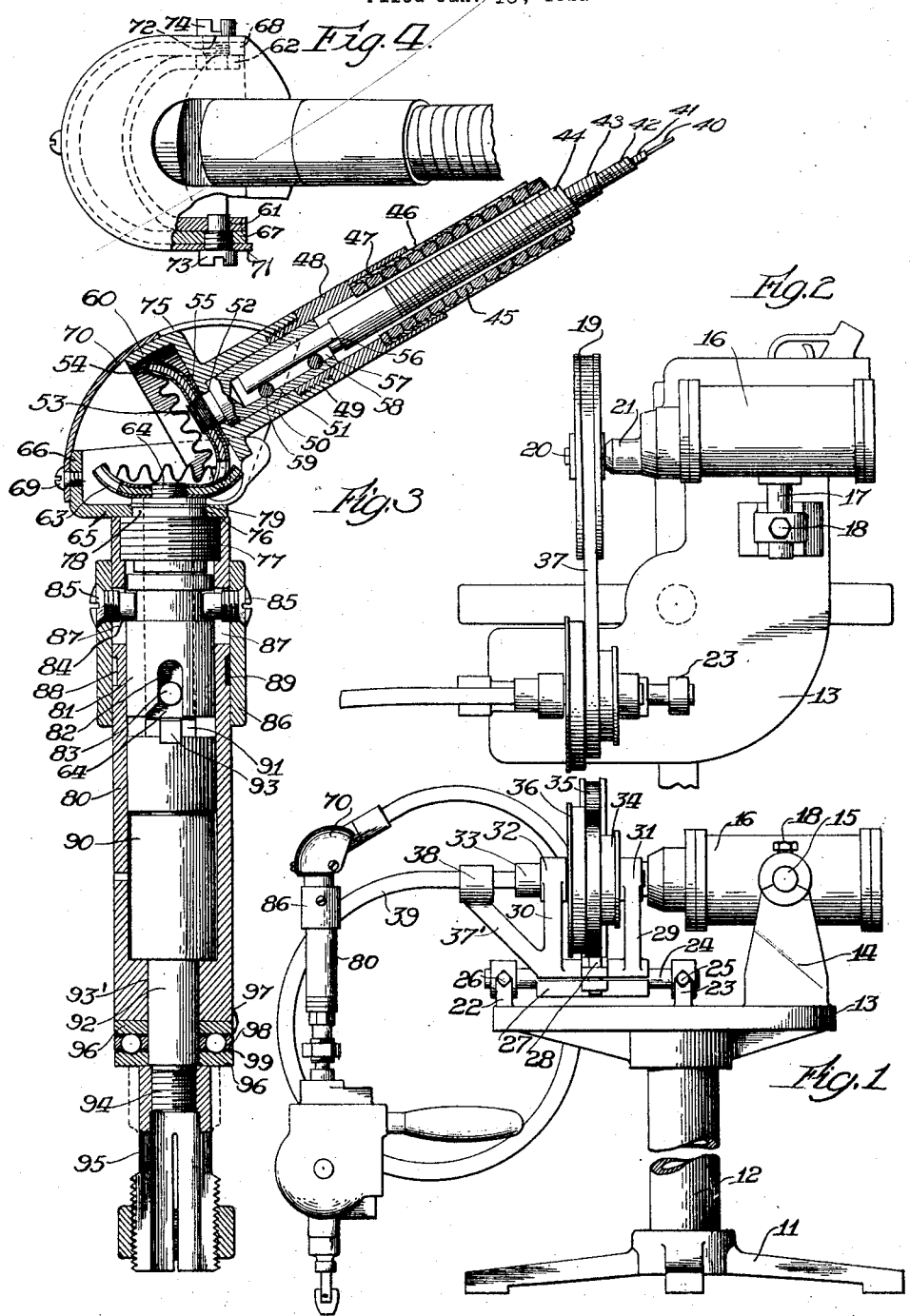
Inventor  
Franz O. Albertson  
Williams Bradbury  
McCalb & Pierce Attys.

Patented Dec. 2, 1924.

1,517,240

UNITED STATES PATENT OFFICE.

FRANS O. ALBERTSON, OF SIOUX CITY, IOWA, ASSIGNOR TO ALBERTSON & COMPANY, OF SIOUX CITY, IOWA, A CORPORATION OF IOWA.

POWER-TRANSMITTING ARRANGEMENT.

Application filed January 16, 1922. Serial No. 529,427.

*To all whom it may concern:*

Be it known that I, FRANS O. ALBERTSON, a citizen of the United States, and resident of Sioux City, in the county of Woodbury and State of Iowa, have invented a certain new and useful Improvement in Power-Transmitting Arrangements, of which the following is a full, clear, concise, and exact description, reference being had to the accompanying drawings, forming a part of this specification.

This invention relates to power transmission devices, and is particularly designed to provide means for use with valve grinders and other devices which require a light and readily movable operating means which may be driven from a stationary motor, as the ordinary portable electrically driven hand drill motor.

One of the features of the invention is the arrangement of parts permitting the use of the usual portable hand drill motor, as the motor for driving a flexible shaft.

Another feature of the invention is the provision of a universal joint at the end of the flexible shaft and between the shaft and the operating mechanism, whereby the necessary length of the device is decreased, permitting its use in small spaces.

Another feature of the invention is the provision of a manually operated clutch associated with the driven member at the end of the flexible shaft, whereby the operator may start or stop the movement of the driven member at will without removing his attention from the parts being operated upon.

Other features and advantages of the invention will appear from time to time as the description of the invention progresses.

In the drawings:

Figure 1 is a side elevation of the complete mechanism;

Figure 2 is a plan view of the support and power means shown in Figure 1;

Figure 3 is a sectional view through the end of the flexible shaft, showing the pivoted joint, clutch and driven member associated therewith; and Figure 4 is a plan view of the pivoted joint shown in Fig. 3 and associated parts.

Referring now to the drawings, 11 represents the base from which projects the pedestal or standard 12. Secured to the upper end of the standard 12, in any desired manner, is the table or plate 13. Projecting upwardly from the plate 13, and fixed thereto in any desired manner, is the supporting member 14, the upper end of which is provided with a socket or bearing 15.

At 16 is indicated a portable electric hand drill of any desired character, which is provided on one side thereof with the projecting lug or trunnion 17, arranged to be received by the socket member 15 and secured therein by means of the set screw 18. The belt wheel 19 is provided with a stub shaft 20 which is arranged to project into and be securely grasped by the chuck 21 of the drill member 16. Projecting upwardly from the plate 13 is also a pair of apertured lugs 22 and 23, within which is fixed the shaft 24 by means of the set screws 25 and 26. Surrounding a portion of the shaft 24 is a split collar 27, which is arranged to be rigidly secured to the shaft 24 by means of the clamping bolt 28.

Projecting upwardly from the collar 27 are the two arms 29 and 30, which are provided adjacent to their upper ends with bearing portions 31 and 32, respectively. The shaft 33 is mounted within the bearings 31 and 32 and has secured thereon the three driven belt or band wheels 34, 35 and 36 of different diameters. A belt 37 is arranged to pass around the driving belt wheel 19 and any desired one of the driven belt wheels 34, 35 or 36.

Also projecting upwardly from the collar 27 is an arm 37' provided with an apertured portion 38 through which projects the flexible shaft 39, one end of which is joined to the shaft 33 of the driven belt wheels 34, 35 and 36.

As the collar 27 is of less length than the supporting shaft 24, by loosening the clamping bolt 28, the assembly may be moved to the right or left, in order to bring any desired one of the driven wheels 34, 35 and 36 in alignment with the wheel 19. Also, due to the pivotal arrangement of the collar on the shaft 24, the driven belt wheel assembly may be rotated forward or back about the shaft in order to tension the belt 37, regardless of which of the driven belt wheels is employed.

The flexible shaft 39 consists of a central strand 40 of wire about which is arranged the concentric spirals of wire 41, 42, 43 and 44, alternate spirals having the wire thereon coiled in opposite directions. Arranged about the outermost coil or spiral 44 is a protective collar or casing comprising the spiral or coil formed of the wire 45. Arranged to overlie the spiral depression occurring between the successive turns in the wire 45 is a coil consisting of the general rectangular or flat strip 46. The strip 46, however, is provided with a projecting point or ridge arranged to particularly lie in the depression between adjacent turns of the coil 45.

The protective covering comprising the coils of wire 45 and 46 is fixed in any desired manner, as by soldering, within the shouldered portion 47 of the collar 48. Secured to the end of the collar 48 by means of the screw-threaded engagement is the fitting 50. Within the fitting 50 and a portion of the collar 49 is a sleeve 51, one end of which projects through the opening 52 in the fitting 50. The projecting end of the sleeve 51 is screw threaded, as at 53, and fixed thereon by the screw-threaded arrangement is the gear 54. A washer 55 may be provided between the gear 54 and the end of the housing member 50.

Fixed to the end of the flexible shaft consisting of the parts 40 to 44, inclusive, is the fitting 56, which is generally round in cross section, but is flattened on the lower side, as seen in Fig. 3. Extending across the lower side of the opening 57 within the sleeve 51 are the pins 58 and 59. Thus when the fitting 56 is inserted in the opening 57 in the sleeve 51, the two parts are locked against rotation of one relatively to the other. When it is desired to remove the flexible shaft from the driven member at the end thereof, all that is necessary is to unscrew the connection 49 and withdraw the member 56 from the socket 57.

Projecting from the fitting 50, and partially surrounding the gear 54, is the flange 60 which terminates at its opposite ends in the parallelly extending bearing portions 61 and 62. The gear 54 is arranged to mesh with a gear 63 which is screw-threaded onto one end of the shaft 64. Arranged adjacent the convex side of the gear 63 is the mounting plate 65, which is provided with a flange 66 arranged to partially encircle the gear 63, and provided at its opposite ends with the parallelly extending portions 67 and 68, arranged to lie adjacent to the portions 61 and 62 of the fitting 50. Fixed to the mounting plate 65, as by the screw 69, is a housing member 70 which is also provided with parallelly extending portions 71 and 72 arranged adjacent to and parallel with the parts 67 and 68, respectively. Each of the pivot screws 73 and 74 is arranged to be screwed into the aligned openings in the parts 71, 67 and 72, 68, respectively, and have an end thereof arranged to be received in the opening in the adjacent parts 61 or 62.

The housing member 70 is provided with a slot 75, within which the fitting 50 may oscillate. Due to the pivotal connection of the flange 60 to the flange 66, the fitting 50 may be caused to approach alignment with the shaft 64 or to be rotated around to a position substantially at right angles to the shaft 64, thus permitting insertion of the device in positions where it would otherwise be impossible to use it.

The mounting plate 65 is provided with an opening 76 in which is secured one end of the externally threaded collar 77. The collar 77 has a portion 78 projecting into the opening 76, and is secured therein by having its edges upset or riveted over, as indicated at 79. Fixed to the collar 77 by being screwed thereon is the sleeve 80. Loosely mounted within the sleeve 80 is a collar 81 provided in its lower edge with the recesses 82 arranged to receive the cross pin 83 on the shaft 64. The collar 81 is provided near its upper end with the circular groove 84, arranged to receive the inwardly extending ends of the lugs 85 which are secured within the sleeve 86, slidably arranged on the outside of the sleeve 80. The sleeve 80 is provided with the longitudinal slots 87 to permit the sleeve 86 to be moved longitudinally thereof. The outer surface of the sleeve 80 is provided with the groove 88 within which is arranged the spring member 89. Spring 89 is arranged to normally have a curvature different from that of the groove 88 and acts to frictionally engage both the sleeve 80 and the sleeve 86, and tends to maintain them in any adjusted position relative to each other.

Arranged within the lower portion of the sleeve 80 is the driven shaft member 90, having a reduced portion 91 at its upper end and a reduced portion 92 at the lower end thereof. The reduced portion 92 is arranged to project through the bearing 93' at the lower end of the sleeve 80. Extending laterally from one side of the portion 91 is the lug 93. When the sleeve 81 is moved downwardly within the sleeve 80, the reduced portion 91 is adapted to be received by the recess within the sleeve 81 and the lug 93 will become seated in the notch 82 formed in the lower edge of the sleeve 81. As the shaft 64 is arranged to be driven in a clockwise direction, as viewed from above in Fig. 3, when the sleeve 81 is in its lowermost position, the lugs 93, as well as the cross pin 83, will both be positioned within the slots 82 and the part 90 will be caused to rotate with the gear 63 and shaft 64.

The reduced portion 92 of the driven member 90 is provided at its lower end with the screw-threaded portion 94 on which may be screwed a chuck 95 of any desired construction. Between the chuck 95 and the end of the sleeve 80 is arranged a thrust ball bearing comprising the upper and lower race rings 96, between which are positioned the inner and outer annular retaining rings 97 and 98, and the balls 99. Within the chuck 95 may be secured any desired instrument, but, in the embodiment herein disclosed, a valve grinder, such as disclosed in applicant's Patent No. 1,386,085, is shown associated with the clutch. However, other devices, such as small drills, grinders, polishing and buffing devices, may be readily associated with the chuck.

The present invention permits the utilization of the ordinary electrically driven portable drill which is present in a large portion of the garages and machine shops as a power device for driving valve grinders or other device which may be associated with the chuck 95. Due to the small and compact structure of the driven part, the device may readily be employed in many places which would be inaccessible to a portable motor. Not only this, but, by arranging the motor separate from the driven part, it permits the operating member to be of light construction, thus permitting it to be used on many types of work where a relatively heavy motor could not readily be employed. The pivoted arrangement between the gears 54 and 63 also permits the device to be readily employed in many positions with much greater facility.

While, in the accompanying drawings, but a single form of the device is disclosed, it is to be understood that many modifications in the details of the structure are contemplated and the invention, therefore, is to be limited merely by the scope of the appended claims.

What I claim is:

1. In a device of the class described, power driving means, a flexible shaft, means joining one end of said shaft to said power means, a driven member, means joining the other end of said shaft to said driven member, said joining means including a pair of co-operating concave gears continuously in mesh, supports for said gears respectively, a housing for said gears fixed to one of said supports, and a pivotal connection joining the other said support to said housing.

2. In power transmitting apparatus, two sections of shaft, crown gears carried on adjoining ends of said shaft sections and adapted to mesh; means to permit movement of said shaft sections relative to each other without disturbing the mesh of said crown gears, said means comprising collars surrounding the ends of said shaft sections; integral upstanding flanges formed on said collars and partially surrounding the respective crown gears; pivot means therefor adjacent the point of mesh of said crown gears; a semispherical casing affixed to one of said flanges and enclosing the meshed crown gears, the said casing being provided with a slot for reception of one of said shaft sections to permit its movement about the pivot point.

3. In a portable drill, a driving motor, a flexible shaft driven by said motor through the medium of belt gearing, a driven tool, means joining the end of said flexible shaft to said tool, said means comprising intermeshing concave gears mounted upon the flexible shaft and tool spindle respectively, and a housing surrounding said gears, the said housing comprising telescoping sections pivoted adjacent the point of meshing of said gears.

In witness whereof, I hereunto subscribe my name this 11th day of January, 1922.

FRANS O. ALBERTSON.

Witnesses:
 OLIVER H. PARMELEE,
 J. DAVID DICKINSON.